United States Patent
Lee

(10) Patent No.: US 11,461,024 B2
(45) Date of Patent: Oct. 4, 2022

(54) COMPUTING SYSTEM AND OPERATING METHOD THEREOF

(71) Applicant: SK hynix Inc., Gyeonggi-do (KR)

(72) Inventor: Jun-Seo Lee, Chungcheongbuk-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 17/185,258

(22) Filed: Feb. 25, 2021

(65) Prior Publication Data

US 2021/0181959 A1     Jun. 17, 2021

Related U.S. Application Data

(62) Division of application No. 16/181,441, filed on Nov. 6, 2018, now Pat. No. 10,956,061.

(30) Foreign Application Priority Data

Mar. 27, 2018  (KR) .................... 10-2018-0035174

(51) Int. Cl.
  *G06F 3/00*   (2006.01)
  *G06F 3/06*   (2006.01)

(52) U.S. Cl.
  CPC .......... *G06F 3/0631* (2013.01); *G06F 3/0613* (2013.01); *G06F 3/0683* (2013.01)

(58) Field of Classification Search
  CPC .................................................. G06F 3/0631
  See application file for complete search history.

(56) References Cited

U.S. PATENT DOCUMENTS

| 2003/0005237 A1* | 1/2003 | Dhong | G06F 12/084 |
| | | | 711/146 |
| 2006/0085617 A1* | 4/2006 | Roberson | G06F 12/023 |
| | | | 711/170 |

FOREIGN PATENT DOCUMENTS

| JP | 2011-118744 A | 6/2011 |
| JP | 2017-162065 A | 9/2017 |
| KR | 10-2010-0050789 A | 5/2010 |
| KR | 10-2015-0044753 A | 4/2015 |
| KR | 10-2016-0112135 A | 9/2016 |
| KR | 10-2017-0034424 A | 3/2017 |
| TW | 200415654 A | 8/2004 |
| TW | 200912645 A | 3/2009 |

(Continued)

OTHER PUBLICATIONS

Office Action issued by the Taiwan Intellectual Property Office dated Mar. 14, 2022.

(Continued)

*Primary Examiner* — Jae U Yu
(74) *Attorney, Agent, or Firm* — IP & T Group

(57) ABSTRACT

A computing system includes: a host configured to provide data and address information on the data; and a memory system configured to store the data, wherein the memory system comprises: a plurality of memory devices configured to be grouped into at least one memory device group; and a controller configured to control each of the plurality of memory devices, wherein the controller comprises: a group setter configured to set the memory device groups with respect to a type of the data by a request of the host; and a processor configured to read the data from, or write the data to, the memory device group corresponding to the type of the data.

9 Claims, 7 Drawing Sheets

(56) References Cited

FOREIGN PATENT DOCUMENTS

TW    200912647 A    3/2009

OTHER PUBLICATIONS

Office Action for Korean Patent Application No. 10-2018-0035174 issued by the Korean Intellectual Property Office dated Aug. 22, 2022.

* cited by examiner

COMPUTING SYSTEM AND OPERATING METHOD THEREOF

CROSS-REFERENCE TO RELATED APPLICATION

This application is a division of U.S. patent application Ser. No. 16/181,441 filed on Nov. 6, 2018, which claims benefits of priority of Korean Patent Application No. 10-2018-0035174 filed on Mar. 27, 2018. The disclosure of each of the foregoing application is incorporated herein by reference in its entirety.

BACKGROUND

1. Field

Various embodiments of the present disclosure relate to a computing device and a method for operating the computing device.

2. Description of the Related Art

Data are becoming important assets in the fourth industrial revolution, and the demands for new technology in support of transferring and analyzing large-scale data at a high data rate are increasing. For example, as artificial intelligence, autonomous driving, robotics, health care, virtual reality (VR), augmented reality (AR), and smart home technologies spread, demands for servers or data centers are increasing.

A legacy data center includes resources for computing, networking, and storing data, in the same equipment. However, a future large-scale data center may have individually constructed resources that are logically restructured. For example, in the large-scale data center, the resources may be modularized at the level of racks, and the modularized resources may be restructured and supplied according to the usage. Therefore, a converged storage or memory device, which can be used for the future large-scale data center, is needed.

SUMMARY

Embodiments of the present disclosure are directed to a computing system capable of processing and assigning efficiently data, and an operating method thereof.

In accordance with an embodiment of the present invention, a computing system includes: a host configured to provide data and address information on the data; and a memory system configured to store the data, wherein the memory system comprises: a plurality of memory devices configured to be grouped into at least one memory device group; and a controller configured to control each of the plurality of memory devices, wherein the controller comprises: a group setter configured to set the memory device groups with respect to a type of the data by a request of the host; and a processor configured to read the data from, or write the data to, the memory device group corresponding to the type of the data.

In accordance with an embodiment of the present invention, a method for operating a computing system may include: grouping, by a controller, a plurality of memory devices into at least one memory device group; requesting, by a host, the controller to set the memory device groups with respect to a type of data; setting, by the controller, the memory device groups according to the request; and reading the data from, or writing the data to, the memory device group corresponding to the type of the data.

In accordance with an embodiment of the present invention, a memory system may include: a plurality of memory devices configured to be grouped into at least one memory device group; and a controller configured to control each of the plurality of memory devices, wherein the controller comprises: a group setter configured to set the memory device groups with respect to a type of data by a request of the host; and a processor configured to read the data from, or write the data to, the memory device group corresponding to the type of the data.

In accordance with an embodiment of the present invention, a computing system includes: a memory system including a plurality of memory devices; and a host suitable for: transmitting, to the memory system, a first request for allocating the plurality of memory devices into a first memory group for processing a first type of data and a second memory group for processing a second type data, and transmitting, to the memory system, data and address information on a target memory block of a target memory group, among the first and second memory groups, to store the data, the target memory group being selected based on whether the data is of the first type or the second type; wherein the memory system is suitable for: allocating the plurality of memory devices into the first memory group and the second memory group based on the first request, and writing the data in the target memory block based on the address information, wherein the host transmits a second request for reallocating the plurality of memory devices in the first and second memory groups based on updated statuses of the plurality of memory devices.

DETAILED DESCRIPTION

Figure 1:
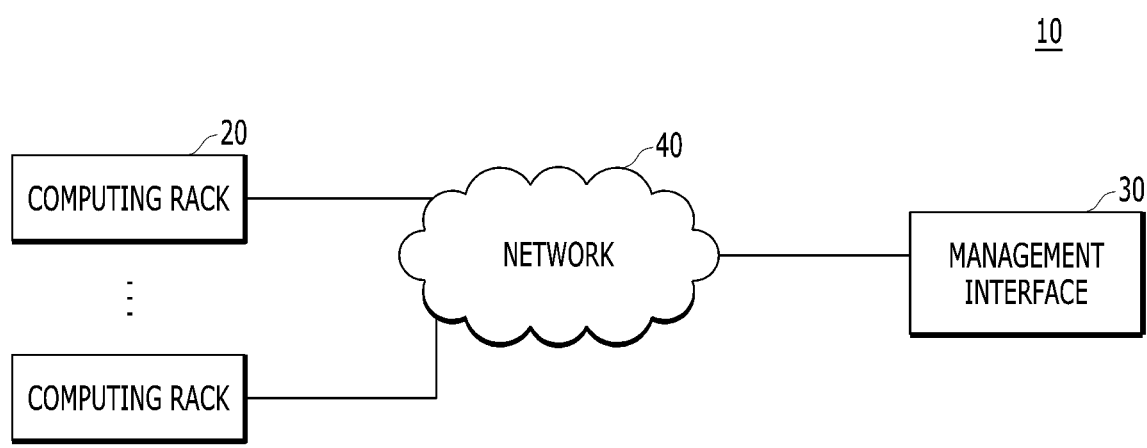
FIG. 1 is a block diagram illustrating a data processing system in accordance with an embodiment of the present disclosure.

Various embodiments of the present disclosure will be described below in more detail with reference to the accompanying drawings. Elements and features of the present disclosure may, however, be configured or arranged differently than shown and described herein. Thus, the present invention is not limited to the embodiments set forth herein. Rather, these embodiments are provided so that this disclosure is thorough and complete and fully conveys the scope of the present disclosure to those skilled in the art. Throughout the disclosure, like reference numerals refer to like parts throughout the various figures and embodiments of the present disclosure. Also, throughout the specification, reference to "an embodiment" or the like is not necessarily to only one embodiment, and different references to any such phrase are not necessarily to the same embodiment(s).

FIG. 1 is a block diagram illustrating a data processing system 10. Referring to FIG. 1, the data processing system 10 may include a plurality of computing racks 20, a management interface 30, and a network 40 for communication between the computing racks 20 and the management interface 30. The data processing system 10 having this rack-scale architecture may be used by a data center for processing large-scale data.

Each of the computing racks 20 may individually implement one computing device. Alternatively, each of the computing racks 20 may be combined with one or more other computing racks to implement one computing device. The specific structures and operations of the computing racks 20 are described below.

The management interface 30 may provide an interactive interface for a user to control, administrate, or manage the data processing system 10. The management interface 30 may be implemented as any of a variety of types of computing devices including a computer, a multi-processor system, a server, a rack-mount server, a board server, a lap-top computer, a notebook computer, a tablet computer, a wearable computing device, a network device, a web device, a distributed computing system, a processor-based system, a consumer electronic device, and the like.

In various embodiments of the present disclosure, the management interface 30 may be implemented as a distributed system having operation functions which may be performed by the computing racks 20 or having user interface functions which may be performed by the management interface 30. In other embodiments of the present disclosure, the management interface 30 may be implemented as a virtual cloud server that includes multi-computing devices distributed through the network 40. The management interface 30 may include a processor, an input/output subsystem, a memory, a data storage device, and a communication circuit.

The network 40 may transfer and/or receive data between the computing racks 20 and the management interface 30 and/or among the computing racks 20. The network 40 may be implemented by an appropriate number of various wired and/or wireless networks. For example, the network 40 may include a publicly accessible global network, such as a wired or wireless local area network (LAN), a wide area network (WAN), a cellular network, and/or the Internet. In addition, the network 40 may include an appropriate number of auxiliary network devices, such as auxiliary computers, routers, and switches.

Figure 2:
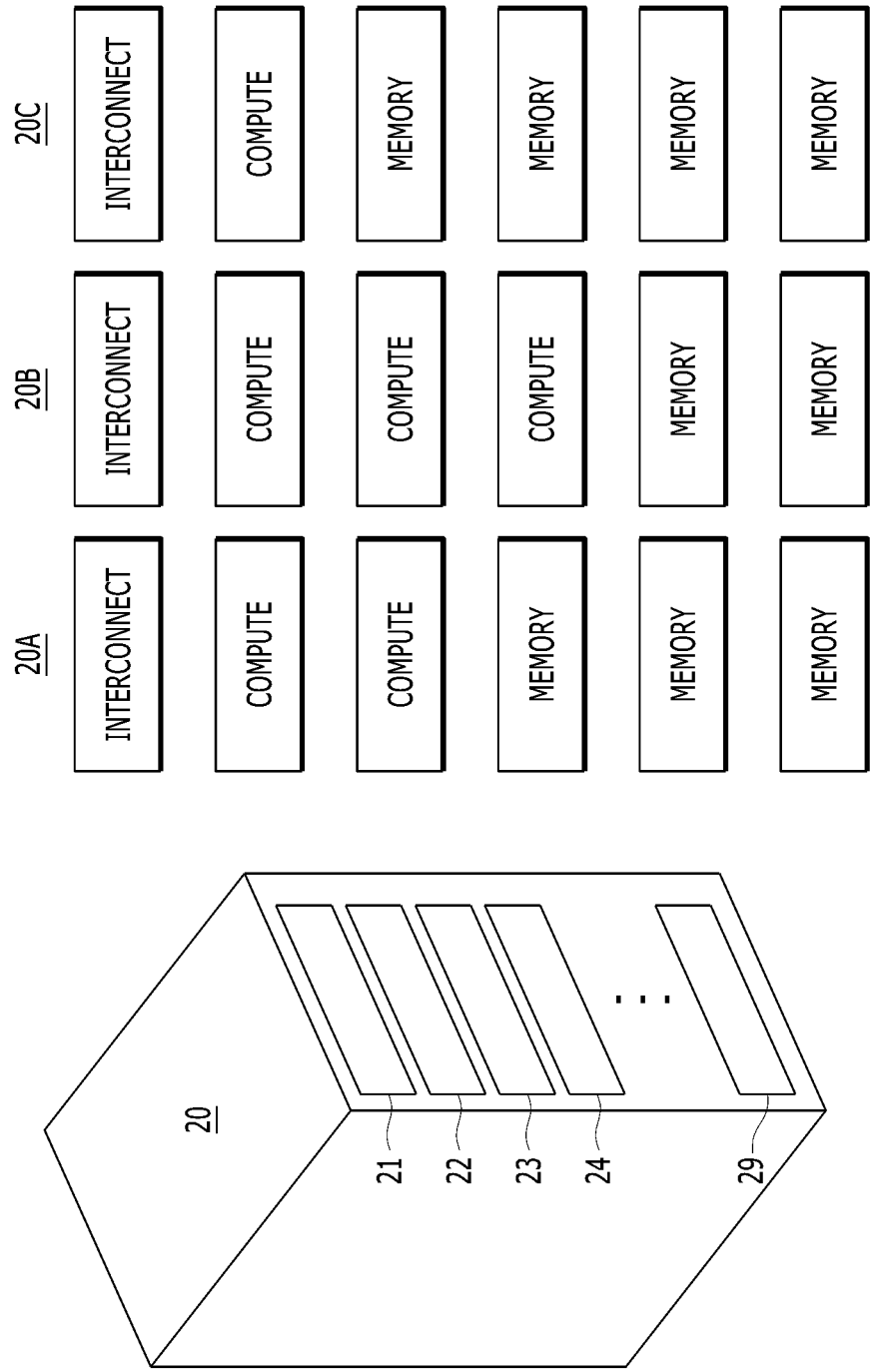
FIGS. 2 and 3 illustrate a computing device or rack in accordance with an embodiment of the present disclosure.

FIG. 2 illustrates an architecture of a computing device having a rack structure, i.e., a computing rack 20 of FIG. 1, in accordance with an embodiment of the present disclosure.

Referring to FIG. 2, the computing rack 20 may include constituent elements in various forms and structures. For example, the computing rack 20 may include a plurality of drawers 21 to 29. Each of the drawers 21 to 29 may include a plurality of modules, each of which may include a plurality of boards.

In various embodiments of the present disclosure, the computing rack 20 may be implemented by a combination of appropriate numbers of computer boards, memory boards, and/or interconnect boards. The computing rack 20 is described as a combination of boards, but the computing rack 20 may also be implemented by other elements such as drawers, modules, trays, boards, sashes, or other suitable units. The computing rack 20 may have a structure in which its constituent elements are disaggregated and classified according to their functions. The computing rack 20 may have a structure of an interconnect board, a compute board, and a memory board with a classification order from the top, although the computing rack 20 is not limited to such structure. The computing rack 20 and a computing device including the computing rack 20 may be referred to as 'a rack-scale system' or 'a disaggregated system.'

In an embodiment of the present disclosure, a computing device may be implemented as one computing rack 20. In other embodiments, the computing device may be implemented by all or some constituent elements of two or more computing racks 20, or some constituent elements of one computing rack 20.

In various embodiments of the present disclosure, a computing device may be implemented by a combination of appropriate numbers of compute boards, memory boards, and interconnect boards that are included in the computing rack 20. As illustrated in FIG. 2, a computing rack 20A may include two compute boards, three memory boards, and one interconnect board. In another example, a computing rack 20B may include three compute boards, two memory boards, and one interconnect board. In still another example, a computing rack 20C may include one compute board, four memory boards, and one interconnect board.

Although FIG. 2 illustrates examples in which the computing rack 20 includes appropriate numbers of compute boards, memory boards, and interconnect boards, the computing rack 20 may include additional constituent elements that may be included in typical servers, such as a power system, a cooling system, an input/output device, and so on.

Figure 3:
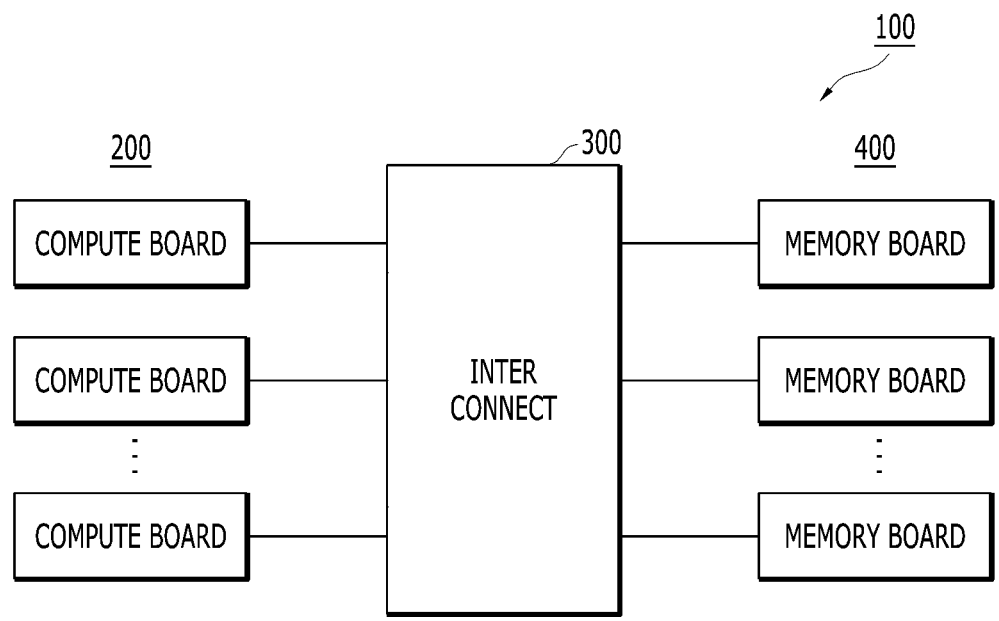

FIG. 3 illustrates a computing device 100 in accordance with an embodiment of the present disclosure.

Referring to FIG. 3, the computing device 100 may include a plurality of compute boards 200, a plurality of memory boards 400, and an interconnect board 300. The compute boards 200 may be pooled compute boards or pooled compute systems. Similarly, the memory boards may be pooled memory boards or pooled memory systems. The computing device 100 is described as a combination of boards, but the computing device 100 may also be implemented by elements such as drawers, modules, trays, boards, sashes, or other suitable components.

Each of the compute boards 200 may include one or more of processing elements such as a processor, a processing/control circuit, a central processing unit (CPU), and the like.

Each of the memory boards 400 may include one or more memories, such as volatile memories, non-volatile memories, or a combination thereof. For example, each of the memory boards 400 may include dynamic random access memories (DRAMs), flash memories, memory cards, hard disk drives (HDDs), solid state drives (SSDs), or a combination thereof.

Each of the memory boards 400 may be divided, allocated, or designated by and used by one or more processing elements that are included in each of the compute boards 200. Also, each of the memory boards 400 may store one or more operating systems (OS) that may be initialized and/or executed by the compute boards 200.

The interconnect board 300 may include a communication circuit, a communication device, or a combination thereof, which may be divided, allocated, or designated by and used by one or more processing elements included in each of the compute boards 200. For example, the interconnect board 300 may be implemented by any suitable number of network interface ports, interface cards, or interface switches. The interconnect board 300 may use protocols related to one or more wired communication technologies for communication. For example, the interconnect board 300 may support communication between the compute boards 200 and the memory boards 400 based on one or more of protocols such as peripheral component interconnect express (PCIe), QuickPath interconnect (QPI), Ethernet, and the like.

Figure 4:
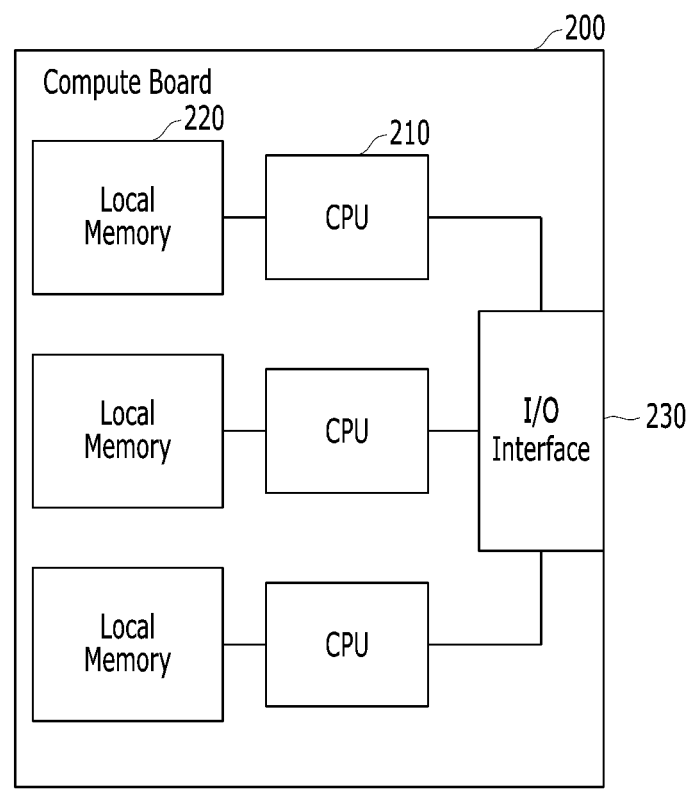
FIG. 4 is a block diagram illustrating a compute board in accordance with an embodiment of the present disclosure.

FIG. 4 is a block diagram illustrating a compute board 200 in accordance with an embodiment of the present disclosure.

Referring to FIG. 4, the compute board 200 may include one or more central processing units (CPUs) 210, one or more local memories 220, and an input/output (I/O) interface 230.

The CPUs 210 may divide, allocate, or designate one or more memory boards to be used, among the memory boards 400 illustrated in FIG. 3. Also, the CPUs 210 may initialize the one or more memory boards, and perform a data read operation and/or a data write (i.e., program) operation on the one or more memory boards.

The local memories 220 may store data to perform an operation of the CPUs 210. In various embodiments of the present disclosure, the local memories 220 may have a one-to-on correspondence with the CPUs 210.

The input/output interface 230 may support interfacing between the CPUs 210 and the memory boards 400 through the interconnect board 300 of FIG. 3. The input/output interface 230 may use protocols related to one or more wired communication technologies, output and transfer data from the CPUs 210 to the interconnect board 300, and receive data inputted from the interconnect board 300 to the CPUs 210. For example, the input/output interface 230 may support communication between the CPUs 210 and the interconnect board 300 using one or more of protocols such as peripheral component interconnect express (PCIe), QuickPath interconnect (QPI), Ethernet and the like.

Figure 5:
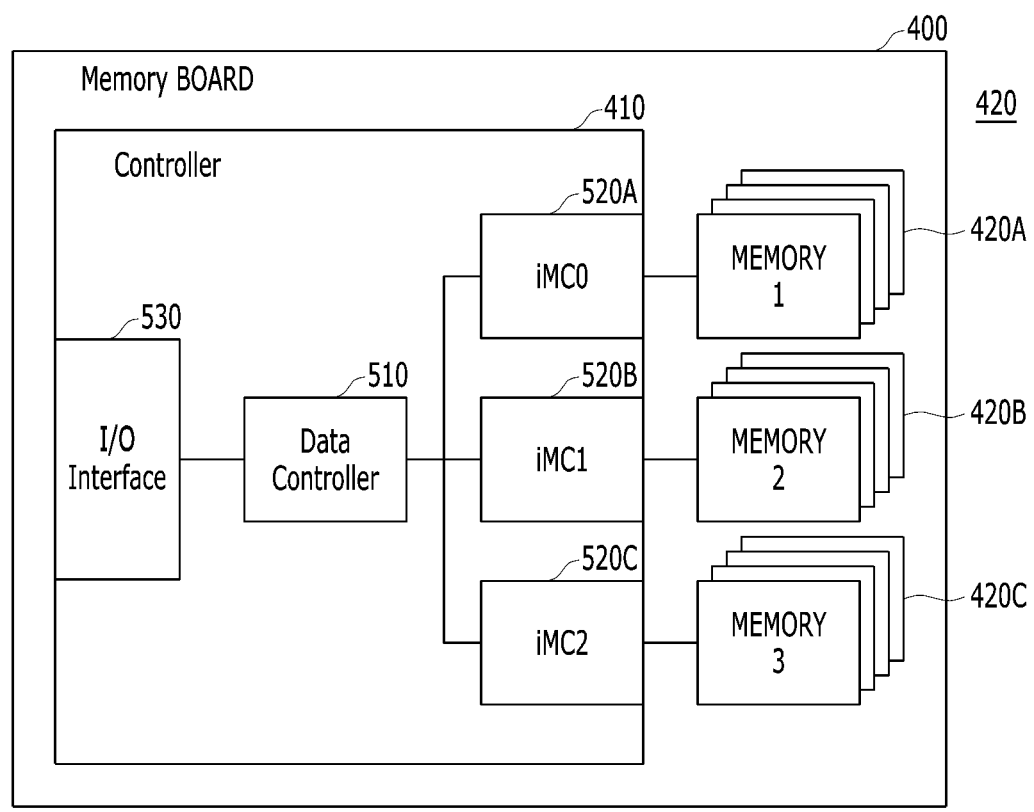
FIG. 5 is a block diagram illustrating a memory board in accordance with an embodiment of the present disclosure.

FIG. 5 is a block diagram illustrating a memory board 400 in accordance with an embodiment of the present disclosure.

Referring to FIG. 5, the memory board 400 may include a controller 410 and a plurality of memories 420. The memories 420 may store (or write) data therein and output (or read) stored data under the control of the controller 410. The memories 420 may include a first memory group 420A, a second memory group 420B, and a third memory group 420C. Each of the first, second, and third memory groups 420A, 420B, and 420C may include multiple memories or memory devices. The first memory group 420A, the second memory group 420B, and the third memory group 420C may have the same characteristics or different characteristics. According to various embodiments of the present disclosure, the first memory group 420A, the second memory group 420B, and the third memory group 420C may include memories having the same characteristics or memories having different characteristics, in terms of capacity or latency.

The controller 410 may include a data controller 510, memory controllers (MC) 520A to 520C, and an input/output (I/O) interface 530.

The data controller 510 may control data transferred and received between the memories 420 and the compute boards 200 of FIG. 3. For example, in response to a write request or command, the data controller 510 may receive write data from the compute boards 200 and control a write operation for writing the write data in a corresponding memory among the memories 420. In a read operation, in response to a read request or command, the data controller 510 may read out data stored in a particular memory among the memories 420 and control the read operation for outputting the read data to a corresponding compute board among the compute boards 200.

The memory controllers 520A to 520C may be disposed between the data controller 510 and the memories 420, and may support interfacing between the data controller 510 and the memories 420. The memory controllers 520A to 520C may include a first memory controller (iMC0) 520A, a second memory controller (iMC1) 520B, and a third memory controller (iMC2) 520C that respectively correspond to the first memory group 420A, the second memory group 420B, and the third memory group 420C included in the memories 420. The first memory controller (iMC0) 520A may be disposed between the data controller 510 and the first memory group 420A, and may support data transfer and/or data reception between the data controller 510 and the first memory group 420A. The second memory controller (iMC1) 520B may be disposed between the data controller 510 and the second memory group 420B, and may support data transfer and/or data reception between the data controller 510 and the second memory group 420B. The third memory controller (iMC2) 520C may be disposed between the data controller 510 and the third memory group 420C, and may support data transfer and/or data reception between the data controller 510 and the third memory group 420C. Although an example where the controller 410 includes three memory controllers is described herein, when the first memory group 420A, the second memory group 420B, and the third memory group 420C include DRAMs, the controller 410 may include a single memory controller.

The input/output interface 530 may support interfacing between the data controller 510 and the compute boards 200 through the interconnect board 300 of FIG. 3. The input/output interface 530 may operate according to one or more protocols related to wired communication technologies to transfer read data from the data controller 510 to the interconnect board 300, and to transfer write data from the interconnect board 300 to the data controller 510. For example, the input/output interface 530 may support communication between the data controller 510 and the interconnect board 300 based on one or more of protocols such as peripheral component interconnect express (PCIe), QuickPath interconnect (QPI), Ethernet, and the like.

Figure 6:
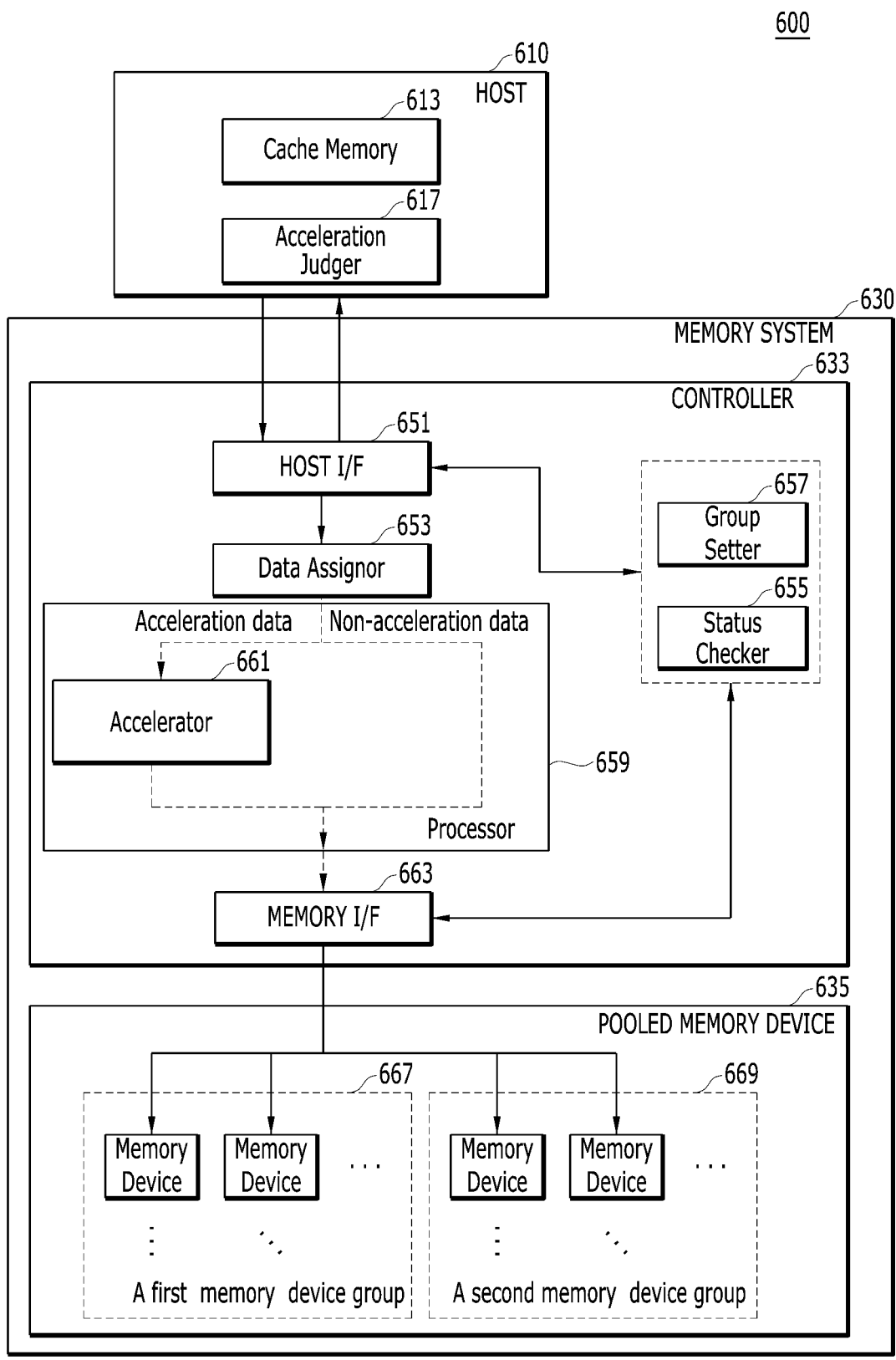
FIG. 6 is a schematic diagram illustrating a structure of a computing system in accordance with an embodiment of the present disclosure.

FIG. 6 is a schematic diagram illustrating a structure of a computing system 600 in accordance with an embodiment. The computing system 600 may correspond to the computing device described in FIG. 2.

The computing system 600 may include a host 610 and a memory system 630.

The host 610 may include at least one compute board 200 and the interconnect board 300 described in FIG. 3 and FIG. 4.

The host 610 may include an acceleration judger 617. The acceleration judger 617 may determine whether corresponding target data is acceleration data or non-acceleration data on the basis of the properties of target data to be processed. Acceleration data refers to data that requires fast processing. Non-acceleration data refers to data that does not require fast processing. A reference or criterion for fast processing may be set by a user. For example, when the number of times that target data is read is greater than a critical value, which may be set in advance, the acceleration judger 617 may determine that the corresponding target data is the acceleration data. It is noted that this criterion is by way of example only; the invention is not limited thereto. For example, when the number of times that target data is accessed is greater than a critical value, which may be set in advance, the acceleration judger 617 may determine that the corresponding target data is the acceleration data.

The acceleration judger 617 determines whether the target data is acceleration data or non-acceleration data, based on which, the host 610 may select a memory device group and one or more memory devices in the selected group for storing the target data. The host 610 may select the memory device(s) for storing the target data, i.e., target memory device(s), among a plurality of memory devices in the selected memory device group on the basis of address information corresponding to the target data. That is, when the memory device group is divided into a first memory device group 667 in which the acceleration data is stored and a second memory device group 669 in which the non-acceleration data is stored, if the target data is the acceleration data, the host 610 may select the first memory device group 667 as the memory device group for storing the target data, i.e., target memory device group, and select a memory device included in the first memory device group on the basis of the address information corresponding to the target data.

Furthermore, the host 610 may include a cache memory 613 capable of storing address information and status information corresponding to each of a plurality of memory devices to be described below. In addition, the host 610 may periodically update the address information and the status information on each of the plurality of memory devices. The cache memory 613 may correspond to the local memory 220 described in FIG. 4.

As described above, the host 610 may divide, assign, or designate data with respect to each of a plurality of memory systems.

The memory system 630 may correspond to the memory board 200 described in FIG. 5. The memory system 630 may include a controller 633 and a pooled memory device 635 including a plurality of memory devices. FIG. 6 illustrates one memory system 630; however, this is only an example; more than one memory system may be accommodated.

The controller 633 may correspond to the controller 410 described in FIG. 5.

The controller 633 may include a host interface (I/F) 651, a data assignor 653, a status checker 655, a group setter 657, a processor 659, and a memory interface (I/F) 663.

The host I/F 651 may correspond to the I/O interface 530 described in FIG. 5. The host I/F 651 may be configured to receive and process commands and data from the host 610 and to communicate with the host 610 through at least one of various interface protocols. For example, as described in FIG. 5, the host I/F 651 may support communication with the host 610 according to protocols such as peripheral component interconnect express (PCIe), QuickPath interconnect (QPI), and Ethernet.

The data assignor 653 may determine the size of data received from the host 610. In addition, the data assignor 653 may store address information on memory blocks having various storage capacities of each of the plurality of memory devices in the pooled memory device 635. Accordingly, the data assignor 653 may select a memory block for storing corresponding data, that is, assign specific data to a specific memory block, on the basis of the data size and the address information. For example, it is assumed that target data is acceleration data and its size is 80 KB, and a memory block having a size of 80 KB and a memory block having a size of 40 KB exist in a memory device in which the target data is to be programmed. The data assignor 653 may select a memory block having a capacity equal to or greater than 80 KB from memory blocks included in the memory device of the first memory device group 667 selected by the host 610. Accordingly, the data assignor 653 may select the memory block on the basis of address information corresponding to the memory block having a size of 80 KB. However, when there is no memory block having a size of 80 KB, the data assignor 653 may select a plurality of memory blocks on the basis of address information corresponding to a plurality of memory blocks having a size of 40 KB. As described above, the data assignor 653 may efficiently manage memory blocks according to the amount of data and thus easily ensure capacity to accommodate the data be stored. Furthermore, since the number of cycling of memory blocks may be reduced due to the operation of the data assignor 653, stress of memory cells may be reduced, so that the reliability of the plurality of memory devices included in the pooled memory device 635 may be improved.

The status checker 655 may periodically check a status of each of the plurality of memory devices included in the pooled memory device 635, and store the checked status as status information. Specifically, the status information may include indicia or values of an erase count, an error count, and a read count of memory blocks in each of the plurality of memory devices. The status checker 655 may count occurrences of erases (erase count), errors (error count), and reads (read count) corresponding to each of the plurality of memory devices on the basis of a command received from the host 610. For example, when the host 610 issues an erase command to a specific memory block in a specific memory device, the status checker 655 may count errors to generate an error count once on the basis of the erase command for the memory block separately from the execution of an erase operation for the memory block. In addition, the status checker 655 may store an error count corresponding to each of a plurality of memory blocks in each of the plurality of memory devices. Moreover, the status checker 655 may store each error count in each of the plurality of corresponding memory devices. Then, when the status checker 655 checks the error count corresponding to each of the plurality of memory blocks in each of the plurality of memory devices, the status checker 655 may check the error count, which corresponds to each of the plurality of memory blocks in each of the plurality of memory devices, through the error count stored therein and the error count stored in each of the plurality of memory devices.

The status checker 655 may detect a bad memory device from the plurality of memory devices on the basis of the status information. For example, when each of the plurality of memory devices includes 100 memory blocks, a memory block having an erase count of '10' or more is considered to be a bad memory block, and a memory device including '60' or more bad memory blocks is considered to be a bad memory device. In this case, the status checker 655 may check the number of bad memory blocks in each of the plurality of memory devices, on the basis of the erase count. If a specific memory device includes '60' or more memory blocks each having an erase count value of '10' or more, the status checker 655 may detect the memory device and determine it to be a bad memory device.

Moreover, the status checker 655 may transfer information on the bad memory device (bad device information) to the host 610, and the host 610 may receive the bad device information, store it in the cache memory 613, and update the stored bad device information as needed. The bad device information may include identifier (ID) information on a corresponding memory device.

The group setter 657 may set memory device groups in the pooled memory device 635 at a request of the host 610. Specifically, the group setter 657 may separately set the first memory device group 667, in which the acceleration data is stored, and the second memory device group 669, in which the non-acceleration data is stored, with respect to the plurality of memory devices in the pooled memory device 635.

Moreover, the group setter 657 may change and reset the already set memory device groups at a request of the host 610. For example, when the host 610 requests resetting for a memory device group on the basis of the bad device information received from the status checker 655 such that a bad memory device included in the first memory device group 667 is changed to the second memory device group 669, the group setter 657 may reset the memory device group at a request of the host 610 such that the bad memory device is included in the second memory device group 669. Furthermore, when there are many requests for processing acceleration data, the group setter 657 may set memory device groups such that the pooled memory device 635 stores only the acceleration data.

The group setter 657 may set memory device groups during the operation of the memory system 630 as well as on boot of the memory system 630.

The processor 659 may read or write target data with respect to the plurality of memory devices in the pooled memory device 635. The processor 659 may process data differently according to a memory device group selected by the host 610. When the target data is acceleration data, the processor 659 may read or write the target data with respect to the memory devices in the first memory device group 667. However, when the target data is non-acceleration data, the processor 659 may read or write the target data with respect to the memory devices included in the second memory device group 669.

Moreover, the processor 659 may include an accelerator 661 capable of giving a higher priority to the processing of acceleration data than the processing of non-acceleration data. The accelerator 661 may include a direct memory access (DMA), and may quickly process the target data through the DMA. Specifically, the accelerator 661 may store a memory map of each of a plurality of memory devices in the first memory device group 667. Accordingly, the accelerator 661 may directly process target data on the basis of the memory map of each of the plurality of memory devices in the first memory device group 667, which is stored in the DMA. That is, the accelerator 661 may quickly process the target data by utilizing the memory maps in the DMA even without scanning a separate memory map mostly managed by the controller 633. Moreover, the DMA may transmit an interrupt signal to the host 610 when transmission of all data is ended. Accordingly, the accelerator 661 may program corresponding acceleration data on the basis of a previously selected memory block. Moreover, the accelerator 661 may use a coherent accelerator interface architecture (CAIA). The CAIA is an interface architecture for consistently connecting the host 610 to the computing system 600 by using a standard PCIe bus.

The memory interface (I/F) 663 may support interfacing between the controller 633 and the pooled memory device 635. For example, the memory I/F 663 may support data transmission and/or reception between the controller 633 and the pooled memory device 635. Furthermore, the memory I/F 663 may support communication between the controller 633 and the pooled memory device 635 according to protocols such as a PCIe, a duel in-line memory module (DIMM), and a non-volatile DIMM (NVD). Moreover, even though the pooled memory device 635 includes different types of plural memory devices, the memory I/F 663 may include one type of protocol, for example, the DIMM.

The pooled memory device 635 may include a plurality of memory devices. The plurality of memory devices may correspond to the plurality of memories 420 described in FIG. 5. The plurality of memory devices in the pooled memory device 635 may include various memories such as phase change random access memories (PCRAMs), dynamic random access memories (DRAMs), NAND flash memories (NANDs), spin transfer-torque magnetic random access memories (STT-MRAMs), resistive random access memories (ReRAMs), and the like.

As described above, the pooled memory device 635 may be divided into the first memory device group 667 and the second memory device group 669 by the group setter 657. Furthermore, types of the plurality of memory devices in the pooled memory device 635 may be different from one another. For example, the pooled memory device 635 may include a plurality of DRAMs and a plurality of PCRAMs. When the pooled memory device 635 includes 30 DRAMs and 70 PCRAMs, the first memory device group 667 may include 20 DRAMs and the second memory device group 669 may include 10 DRAMs and 70 PCRAMs. In another example, the first memory device group 667 may include 30 DRAMs and 10 PCRAMs and the second memory device group 669 may include 60 PCRAMs. These groupings are exemplary; other suitable groupings may be used consistent with the teachings herein.

Figure 7:
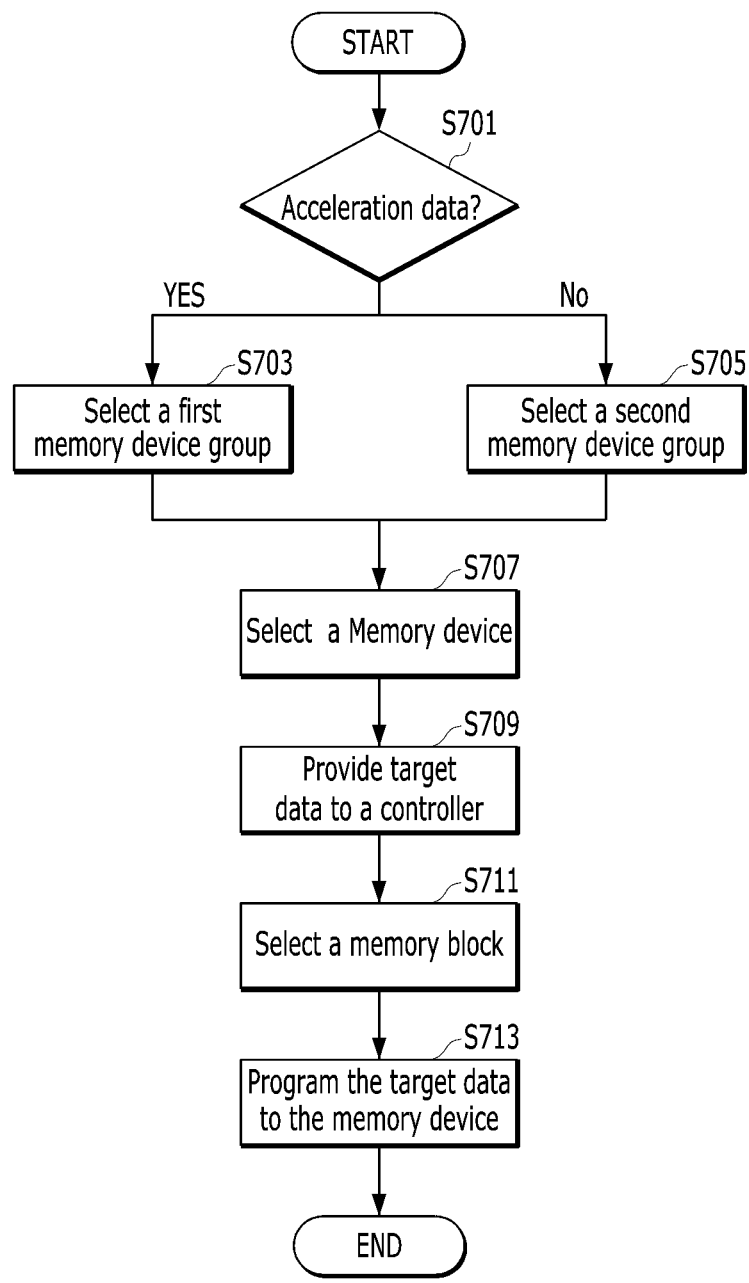
FIG. 7 is a flowchart illustrating an operation of a computing system in accordance with an embodiment of the present disclosure.

FIG. 7 is a flowchart illustrating an operation of a computing system, for example, the operation of the computing system 600 in accordance with an embodiment.

At step S701, the acceleration judger 617 may determine whether target data is acceleration or non-acceleration data as described in FIG. 6.

When the target data is acceleration data ('Yes' at step S701), the host 610 may select the first memory device group 667 for storing the target data at step S703.

When the target data is non-acceleration data ('No' at step S701), the host 610 may select the second memory device group 669 for storing the target data at step S705.

At step S707, the host 610 may select a memory device on the basis of address information corresponding to the target data. The memory device is selected from the first memory device group 667 when the result of step S701 was 'Yes', and is selected from the second memory device group when the result of step S701 is 'No'.

The operations from step S701, S703, S705, and step S707 are performed by the host 610.

At step S709, the host 610 may provide the target data to the controller 633.

At step S711, the data assignor 653 may determine the size of the target data. Moreover, as described in FIG. 6, the data assignor 653 may select a memory block of the selected memory device on the basis of the size of the target data.

At step S713, the processor 659 may program the target data to the memory block of the selected memory device. When the target data is acceleration data, the processor 659 may program the acceleration data to one or more memory blocks of the memory device selected from the first memory device group 667. When the target data is non-acceleration data, the processor 659 may program the non-acceleration data to one or more memory blocks of the selected memory device in the second memory device group 669.

Figure 8:
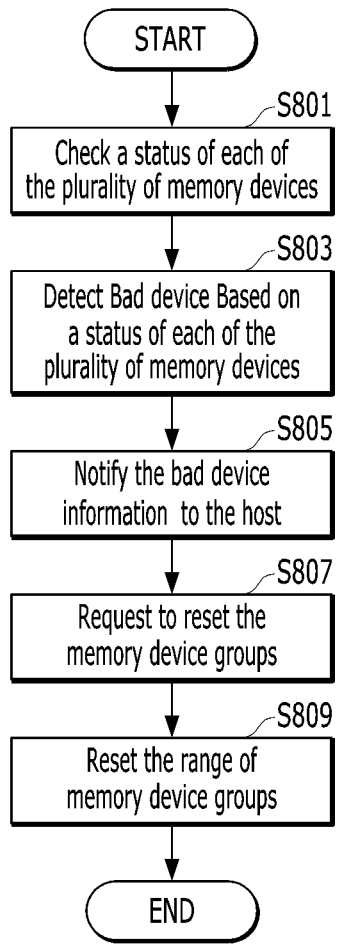
FIG. 8 is a flowchart illustrating an operation of a computing system in accordance with an embodiment of the present disclosure.

FIG. 8 is a flowchart illustrating an operation of a computing system, for example, the operation of the computing system 600 in accordance with an embodiment. Specifically, FIG. 8 is a flowchart illustrating the operation of the computing system 600 that adjusts the pooled memory device 635.

At step S801, the status checker 655 may periodically check a status of each of the plurality of memory devices in the pooled memory device 635. Moreover, the status checker 655 may receive status information on each of the plurality of memory devices in the pooled memory device 635 through the memory I/F 663.

At step S803, the status checker 655 may detect a bad memory device on the basis of the received status information as described in FIG. 6.

At step S805, the status checker 655 may inform the host 610 of information on the detected bad memory device through the host I/F 651.

At step S807, the host 610 may transmit a request to the controller 633 for resetting the memory device groups in the pooled memory device 635 on the basis of the bad device information received from the status checker 655. For example, the host 610 may transmit a request to the controller 633 for adjusting or rearranging memory device groups such that the bad memory device in the first memory device group 667 is included in the second memory device group 669. Alternatively, the host 610 may make such determination by itself and transmit a request for adjusting memory device groups according to a data processing amount. In another example, when only acceleration data is to be continuously processed for a certain period of time, the host 610 may transmit a request to the controller 633 such that the entire pooled memory device 635 is utilized as the first memory device group 667 at least during the certain period of time.

At step S809, the group setter 657 may reset the memory device groups at the request of the host 610. For example, the group setter 657 may set the range of the first memory device group 667 and the second memory device group 669. Although not illustrated in the drawing, the group setter 657 may set the memory device groups and inform the host 610 about the setting, and the host 610 may receive the setting information and update address information on each of the plurality of memory devices.

The computing system in accordance with embodiments determines the amount of data received from the host 610, selects a memory device group, memory device(s) and memory block(s) thereof for storing the data according to the amount of the data, and the type of data, i.e., acceleration or non-acceleration data, which is determined according to the properties of the data received from the host 610. Based on these determinations, the computing system stores data in a set area, so that it is possible to improve the storage efficiency and the processing speed of a memory.

Although various embodiments have been described and illustrated, it will be apparent to those skilled in the art in light of this disclosure that various changes and modifications may be made without departing from the spirit and scope of the invention as defined in the following claims.

What is claimed is:

1. A computing system comprising:
 a memory system including a plurality of memory devices; and
 a host suitable for:
  transmitting, to the memory system, a first request for allocating the plurality of memory devices into a first memory group for processing a first type of data and a second memory group for processing a second type data, and
  transmitting, to the memory system, data and address information on a target memory block of a target memory group, among the first and second memory groups, to store the data, the target memory group being selected based on whether the data is of the first type or the second type;
 wherein the memory system is suitable for:
 allocating the plurality of memory devices into the first memory group and the second memory group based on the first request, and
 writing the data in the target memory block based on the address information,
 wherein the host transmits a second request for reallocating the plurality of memory devices in the first and second memory groups based on updated statuses of the plurality of memory devices,
 wherein the memory system comprises:
  a plurality of memory devices configured to be grouped into a plurality of memory device groups; and
  a controller configured to control each of the plurality of memory devices, wherein the controller comprises:
   a group setter configured to set the plurality of memory device groups with respect to a type of the data by a request of the host; and
   a processor configured to read the data from, or write the data to, one among the memory device groups according to the setting,
  wherein the first type of data is processed at a higher speed and the second type of data is processed at a lower speed, and
  wherein the plurality of memory device groups includes a first memory device group set to process the first type of data and a second memory device group set to process the second type of data.

2. The computing system of claim 1, wherein the first type of data is acceleration data and the second type of data is non-acceleration data.

3. The computing system of claim 1, wherein the controller further comprises:
 a status checker configured to check and store status information on each of the plurality of memory devices, and detect a bad memory device from the plurality of memory devices based on the status information.

4. The computing system of claim 3, wherein the status checker transfers the status information of the bad memory device to the host.

5. The computing system of claim 4, wherein the group setter resets the grouping of the plurality of memory devices in the plurality of memory device groups by the request of the host based on the status information of the bad memory device.

6. The computing system of claim 1, wherein the controller further comprises:
 a data assignor configured to select a memory block of a memory device, which is selected by the host, in the memory device group for the type of the data, based on a size of the data.

7. The computing system of claim 6, wherein the processor stores the data in the selected memory block.

8. The computing system of claim 1, wherein the processor comprises:
 an accelerator configured to preferentially process the acceleration data over the second type of data.

9. The computing system of claim 8, wherein the accelerator includes a direct memory access (DMA).

\* \* \* \* \*